United States Patent [19]

Müller

[11] Patent Number: 4,717,850
[45] Date of Patent: Jan. 5, 1988

[54] TWO-PULSE BRUSHLESS D.C. MOTOR WITH AUXILIARY ROTOR POLES

[75] Inventor: Rolf Müller, St. Georgen, Fed. Rep. of Germany

[73] Assignee: Papst-Motoren GmbH & Co KG, St. Georgen, Fed. Rep. of Germany

[21] Appl. No.: 733,132

[22] Filed: May 10, 1985

[30] Foreign Application Priority Data

May 19, 1984 [DE] Fed. Rep. of Germany ....... 3418773

[51] Int. Cl.$^4$ ............................................. H02K 21/22
[52] U.S. Cl. .................................. 310/156; 310/67 R
[58] Field of Search ................. 310/67, 68, 156, 154, 310/261; 318/138, 254 R, 254 A

[56] References Cited

U.S. PATENT DOCUMENTS

| | | | |
|---|---|---|---|
| 4,217,508 | 8/1980 | Uzuka | 310/46 |
| 4,481,440 | 11/1984 | Müller | 310/156 |
| 4,494,028 | 1/1985 | Brown | 310/156 |
| 4,574,211 | 3/1986 | Müller et al. | 310/156 |

FOREIGN PATENT DOCUMENTS

| | | |
|---|---|---|
| 0160522 | 11/1985 | European Pat. Off. . |
| 2823208 | 1/1979 | Fed. Rep. of Germany . |
| 2062976 | 5/1981 | United Kingdom . |
| 1604122 | 12/1981 | United Kingdom . |
| 1603969 | 12/1981 | United Kingdom . |

Primary Examiner—Patrick R. Salce
Assistant Examiner—D. L. Rebsch
Attorney, Agent, or Firm—Theodore J. Koss, Jr.

[57] ABSTRACT

In the case of a two-pulse brushless d.c. motor narrow auxiliary poles (81-84; 115-122) are provided in the region of the boundaries (44, 45) between neighboring main poles of the rotor, the auxiliary poles being at least in part of polarity opposite to that of the surrounding main poles of the rotor. As a result of this, one obtains an especially favorable functional dependence of the induced voltage upon rotor angular position.

20 Claims, 13 Drawing Figures

TWO-PULSE BRUSHLESS D.C. MOTOR WITH AUXILIARY ROTOR POLES

BACKGROUND OF THE INVENTION

The invention concerns two-pulse brushless d.c. motors of the type comprising a wound stator having a least one conductor, each conductor being wound to form at least one concentrated coil, and further having a permanent-magnet rotor. During rotation, the main poles of the rotor induce in each coil an induced voltage formed by positive and negative half-cycles alternating with each other, as a result of each coil being exposed to transitions from north rotor flux to south rotor flux, or vice versa.

In these two-pulse brushless d.c. motors, the voltage induced in each coil exhibits a transitional interval, the number of transitional intervals being equal to the number of main poles of the rotor. During each such transitional interval, the induced voltage in each coil undergoes a transition from one voltage polarity to the opposite voltage polarity. Although such transition from one voltage polarity to the opposite voltage polarity is gradual, i.e., not instantaneous, the voltage polarity change exhibits a slope of relatively high absolute value. Furthermore, during each such transitional interval the voltage induced in each coil contributes to form a total induced voltage the absolute value of which is such as to form an induced voltage valley.

Because the electromagnetically generated torque produced by the motor corresponds somewhat closely to the total induced voltage (total back EMF), any electromagnetic torque generated within the range of rotor positions corresponding to such induced voltage valley will be of relatively low value, especially at the range of rotor positions corresponding to the bottom region of the induced voltage valley. In effect, the electromagnetically generated torque exhibits valleys similar to those exhibited by the total induced voltage. Being thus of low value at such range of rotor angular positions, the electromagnetic torque may be too weak to maintain the rotor in rotation, for example during heavy mechanical loading on the motor shaft, and most especially during motor start-up.

Accordingly, motors of this type are typically provided with some means for furnishing an auxiliary torque, operative during such valleys or gaps in the electromagnetic torque to compensate for the low values of the electromagnetic torque within such valleys. Over the range of rotor positions corresponding to such valleys, or at least corresponding to the bottom regions of such valleys, the auxiliary torque is exerted in a direction the same as the desired rotation direction.

As well known to persons familiar with this type of motor, each commutation of the motor generally occurs at a rotor position corresponding to one of the induced voltage or electromagnetic torque valleys.

Motors of this type have become variously known from the assignee's products and are employed, for example as the drive motor in disk drives. Examples of such motors, and of the driving circuits therefor, can be found in U.S. Pat. Nos. 3,873,897, 3,840,761, 4,099,104 and 4,429,263, the entire disclosures of which are incorporated herein by reference. When these motors are employed in disk drives, they are often provided with a brake, and when the motor is switched on, the brake is disengaged. It will sooner or later happen that the rotor is braked to a stop by the brake in an unlucky position corresponding to one of the aforementioned induced voltage or electromagnetic torque valleys. When the motor is switched on again the only torque available to drive the rotor is aforementioned the auxiliary torque. The auxiliary torque can for example be a mechanically produced auxiliary torque, or a reluctance torque whose shape and functional dependence upon rotor rotation can, in the case of a cylindrical-air-gap motor, be predetermined by the shape of the air gap. This auxiliary torque, then, must turn the rotor into a position in which the electromagnetically generated torque is able to drive the rotor.

With such motors a certain problem can arise from the tolerance variations in the system that controls the time of occurrence of the motor commutation, e.g. tolerance variations in the Hall generators or Hall-IC's that are used for this purpose, or mechanical tolerance variations in the motor. In particular as a result of such tolerance variations the commutation may occur earlier or later than intended. The result of this can be that, at the time of occurrence of the commutation, the electromagnetically generated torque is negative, i.e., seeks to turn the rotor backwards. It is at exactly this time that the auxiliary torque is being relied on to turn the rotor forwards. The sum of the two torques can in such situations be close to zero; i.e., upon disengaging the brake the motor does not start up.

SUMMARY OF THE INVENTION

Accordingly it is an object of the invention to overcome the problem just set forth.

In accordance with the invention this is achieved by configuring and magnetizing the permanent-magnet rotor, at each transition from a main pole of one polarity to a main pole of the opposite polarity in a manner such that during each of the aforementioned transitional intervals of induced voltage the total induced voltage has, during an intermediate minor part of such transitional interval, a slope of comparatively low absolute value at least approximately equal to zero, a magnitude at least approximately equal to zero, and at one point a value exactly equal to zero, this latter point being located intermediate the start and end of the intermediate minor part of the transitional interval and constituting a zero-crossover point at which the total induced voltage changes from one voltage polarity to the opposite voltage polarity.

This assures that electromagnetically generated torque produced by the motor during motor operation will have an absolute value at least approximately equal to zero within the aforementioned intermediate minor part of the transitional interval.

The advantage of this is that a commutation intended to occur at a rotor angular position in the vicinity of such zero-crossover point but occurring earlier or later than intended, if the commutation at worst occurs within the intermediate minor part of the transitional interval, will not cause electromagnetically generated torque to be exerted opposited to the desired rotation direction and thus very disadvantageously counteract the auxiliary torque.

If for the auxiliary torque one employs a reluctance torque realized by resort to certain measures adopted known design measures concerning the motor's air gap, there then results the additional important advantage that this reluctance torque is actually increased in its effectiveness and acts uniformly over a larger range of angular positions than it would absent the inventive techniques. This likewise improves the reliability of start-up. The invention can, however, be employed even in the case of motors using a mechanically produced auxiliary torque (such motors were installed in WWII American bomber planes), and the invention can also be used to influence the shape of the electromagnetically generated torque in motors of any structural type.

The presently preferred manner of introducing into the induced voltage valley an intermediate minor interval having a slope of at least approximately zero absolute value is by resort to a particular scheme of configuring and magnetizing the permanent-magnet rotor. Specifically, one uses a permanent-magnet rotor designed such that, at each transition from a main pole of one polarity to a main pole of the opposite polarity, the magnetization exhibited by the rotor includes an auxiliary pole. The auxiliary pole is located within the pole pitch of a first one of the two main poles that are located at such main-pole transition, but the auxiliary pole has the magnetic polarity of the other of such two main poles.

Alternatively, the magnetization can be such as to form two auxiliary poles, one a north auxiliary pole located within the pole pitch of the south main pole, the other a south auxiliary pole located within the pole pitch of the north main pole.

If as just stated one employs two auxiliary poles, then it is preferred that these, considered as a pair, be offset opposite to the intended rotation direction relative to the two main poles, the latter likewise being considered as a pair. This will become clearer from the description of preferred embodiments, further below.

If the just mentioned offset is of sufficient magnitude, it may be that the first of the two auxiliary poles comes to adjoin the one of the two main poles that contains the second auxiliary pole, in which event the first auxiliary pole can be looked upon as a prolongation, in the circumferential direction, of such main pole and thereby lose its identity in a pictorial sense. The question of whether one or two auxiliary poles is employed at a main pole transition will likewise become clearer from the description of preferred embodiments, further below.

In accordance with the invention the auxiliary-pole arrangement can in very advantageous manner be combined with a magnetization technique such as disclosed in West German published patent application ("Offenlegungsschrift") DE-OS No. 31 25 694, whose purpose is to compensate for axial asymmetries of the motor or to impart to the induced voltage a predetermined advantageous shape. Use of the invention of DE-OS No. 31 25 694, however, is not a necessary pre-condition for the present invention.

The novel features which are considered characteristic of the invention are set forth in particular in the appended claims. The invention itself, however, both as to its construction and its method of operation, together with additional objects and advantages thereof, will be best understood from the following description of specific embodiments when read in connection with the accompanying drawing FIGS.

BRIEF DESCRIPTION OF THE DRAWING

FIGS. 1–5 depict a first embodiment of an inventive 2-pulse brushless d.c. motor, FIG. 1 being a sectioned side view taken along section line I—I of FIG. 2;

FIG. 2 is a sectioned top view taken along section line II—II of FIG. 1;

DESCRIPTION OF THE PREFERRED EMBODIMENTS

Figure 11:
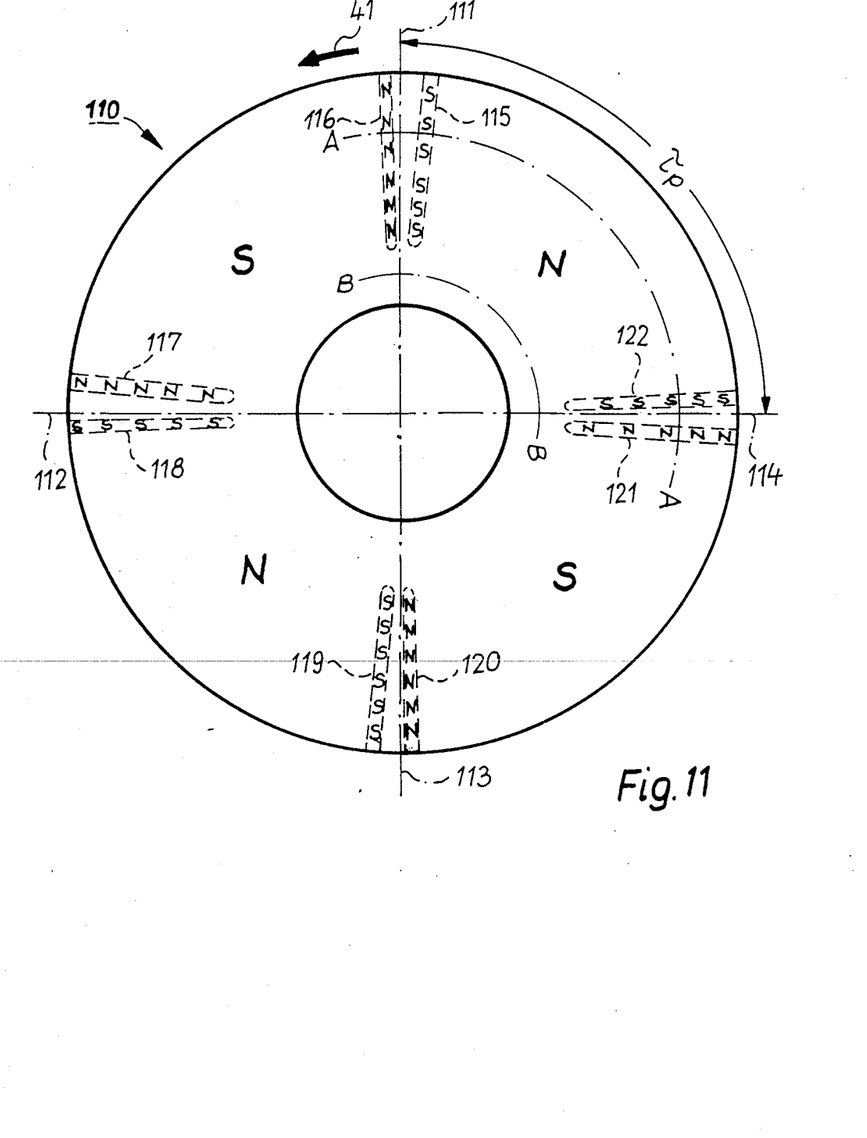
FIG. 11 is a top view of the annular rotor magnet of a flat-air-gap brushless d.c. motor constituting a third embodiment of the invention.

The two-pulse brushless d.c. motor 7 shown in FIGS. 1–5 has an internal stator denoted by 10, whose stack 11 of laminated sheet-metal in the present exemplary embodiment has a peripheral outline such as described in detail in West German patent DE-PS No. 23 46 380, in particular with regard to the shape of the air gap 23. Reference is expressly made to the embodiments shown there, especially with regard to the shape of the reluctance torque that is produced. In the embodiment of present FIGS. 1–5, a generally trapezoidally shaped rotor magnetization is employed to cooperate with the peripheral outline of stator stack 11 in a manner described below in connection with FIG. 6. Although the illustrated motor is an external-rotor motor, the invention can be applied in the same way to internal-rotor motors and flat-air-gap motors, and likewise to brushless d.c. motors other than those of the two-pulse type. FIG. 11 depicts an exemplary embodiment of a flat-air-gap motor.

The sheet-metal stack 11 (FIGS. 1 and 2) is held together by three pins 15, 16, 17, each provided with a thickened portion 14. The stack 11 has a central aperture which recieves a bearing pipe 19 press-fitted in, the latter having at one of its ends a mounting flange 20. Wound in the slots 8 and 9 of the sheet-metal stack 11 are two stator coils 24 and 25, which as shown are concentrated coils that do not overlap each other. The absence of coil overlap contributes to a small axial height for the motor. A free space 21 remains between the two coils 24, 25.

Figure 1:
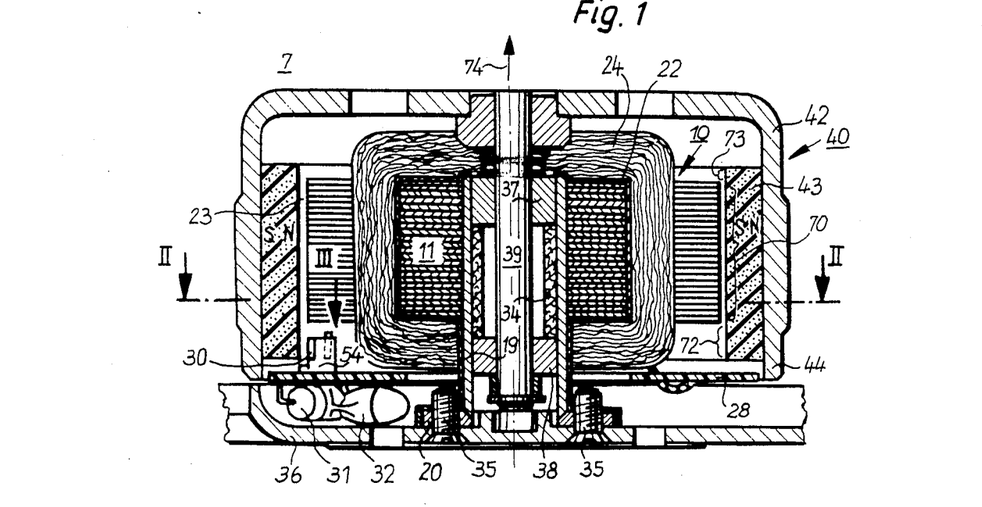

Secured to the lower ends of the pins 15–17 is a circuit board 28 made of a suitable insulating material. The latter is provided with a printed circuit to which the connecting terminals of the stator coils 24 and 25 are directly connected. The circuit board furthermore carries the entire electrical circuit for controlling the currents in the coils 24 and 25. These currents are commutated in dependence upon rotor position by means of a sensor, preferably galvanomagnetic, secured on the circuit board 28, the sensor here being, by way of example, a Hall-IC 30. However, other types of commutation are likewise possible within the scope of the invention. FIG. 1 schematically depicts two electronic components 31, 32 which are securely soldered onto the circuit board 28. A suitable commutation circuit for a two-pulse motor whose rotor winding is formed by a single conductor is depicted for example in West German published patent application ("Offenlegungsschrift") DE-OS No. 30 22 836 (D 131), and a commutation circuit for a two-pulse motor whose stator winding is formed by two conductors is depicted in West German DE-OS No. 30 10 435 (D 130). For the sake of brevity herein, reference is made to these publications for examples of suitable commutation circuits. The present invention is equally suitable irrespective of whether the stator winding is formed by only one conductor or by two conductors.

The stator arrangement is secured on a motor carrier 36 by means of its flange 20 and screws 35. A rotor shaft 29 is arranged in the bearing pipe 19 in two anti-friction bearings 37, 38, between which latter an oil-supply wick 34 is provided; the rotor shaft at its upper end in FIG. 1 carries an external rotor 40 comprising a rotor bell 42 formed from deep-drawn soft iron, open in the downwards direction and encircling the stator 10. A continuous, annular rotor magnet 43 is arranged in the rotor bell 42. The magnet has two main poles, these being denoted in FIGS. 1 and 2 by the letters N (=north pole) and S (=south pole) and radially magnetized in the indicated way. The boundaries between the two main poles are denoted by 44 and 45. The illustrated motor has two rotor poles. The invention is suitable in the same manner for higher numbers of rotor poles. The rotation direction of the rotor 40 is denoted by 41 in the drawings.

Figure 2:
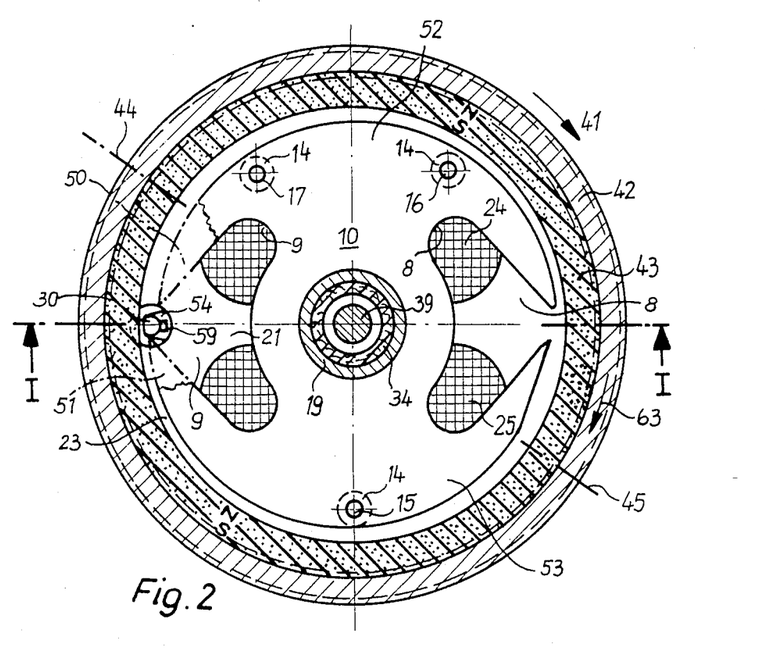
Figure 3:
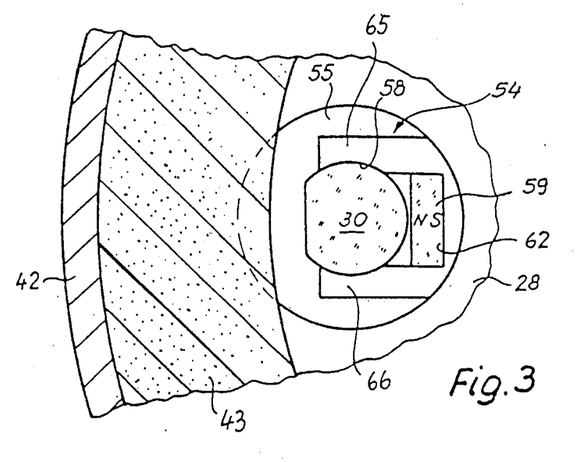
FIG. 3 is an enlarged-scale top view of the detail of the motor structure indicated by line III of FIG. 1.
Figure 4:
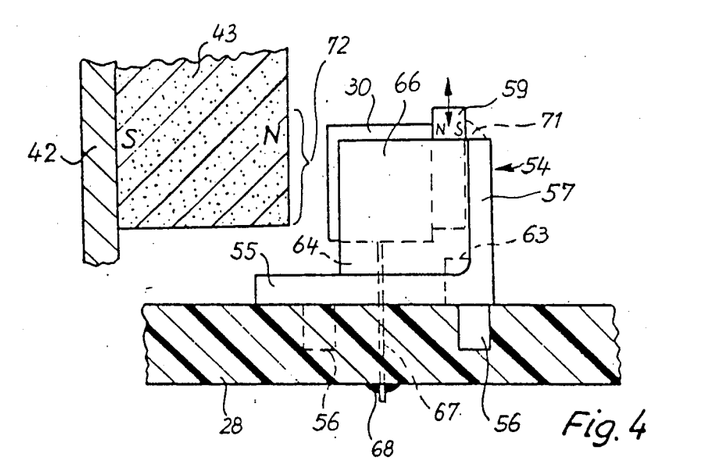
FIG. 4 is a sectioned side view of the same detail of motor structure shown in FIG. 3.

The Hall-IC 30 is arranged in the intermediate space between the two stator coils 24 and 25, namely in FIG. 2 near the left pointed pole tips 50 and 51 in the region between the two stator poles 52 and 53. The pole tips 50 aand 51 enclose, as shown, the left slot 9 and form between themselves a relatively narrow slot opening for introduction of the stator coils 24 and 25. As FIG. 2 clearly shows, the stator 10 is configured symmetrically relative to its center point.

The Hall-IC 30 is incorporated in a synthetic-plastic cast element 54 secured on the board 28. Cast element 54 is shown in greater detail in FIGS. 3 and 4 and has a circular base plate 55, from which latter projections 56 project down, into corresponding recesses in the board 28, or into some other carrier member, to predetermine the position of the cast element 54. Projecting up from the base plate 55 is a projection 57 provided with a recess 58 serving to accommodate, with motion-obstructing engagement, the Hall-IC 30 and a permanent-magnet element 59. Magnet 59 is shiftable in a guide channal 62 provided below with a stop portion 63. A spacing member 64 determines the spacing of the bottom face of the Hall-IC 30 from the base plate 55. The two side cheeks 65, 66, between which Hall-IC 30 is located, are somewhat springy and in that way hold the Hall-IC 30. The latter has, at its bottom, wire connectors 67 of which only one is illustrated, and the latter are at 68 soldered to conductor paths on the circuit board 28. The permanent-magnet member 59 is fixed in place by means of a drop of cement 71. It serves to make the motor symmetric; cf. U.S. Pat. No. 4,482,849.

In order to correctly control the Hall-IC 30 a certain magnetic-flux density is required of the rotor magnet 43; i.e., the overhang region 72 of the rotor magnet 43, extending downwardly past the stator's sheet-metal stack 11, must have a certain minimum length, e.g. of 5 to 10 mm. In contrast, at the opposite end the overhang region 73 can be shorter inasmuch as, there, a longer overhang region brings no useful result and wastes expensive magnetic material. In FIG. 1, 70 denotes the part of the rotor magnet 43 which is located opposite the stator's sheet-metal stack 11.

These differing sizes of the overhang regions 72 and 73 have the result that a force 74 is exerted on the rotor 40 in the upwards direction (see FIG. 1), inasmuch as the rotor magner 43 endeavors to displace itself symmetrically relative to the stator's sheet-metal stack 11. This upwardly acting force 74 is, in addition, dependent upon the angular position of the rotor, because the air gap 23 in FIG. 2 does not have the same size all around; see West German patent DE-PS No. 23 46 380 where the air gap's shape is discussed in detail. Accordingly, this force 74 can produce oscillations and disturbing noises. To reduce or eliminate this disturbing phenomenon a special magnetization of the rotor magnet 43 can be employed such as depicted in U.S. Pat. No. 4,574,211 and also shown in present FIG. 5.

Figure 5:
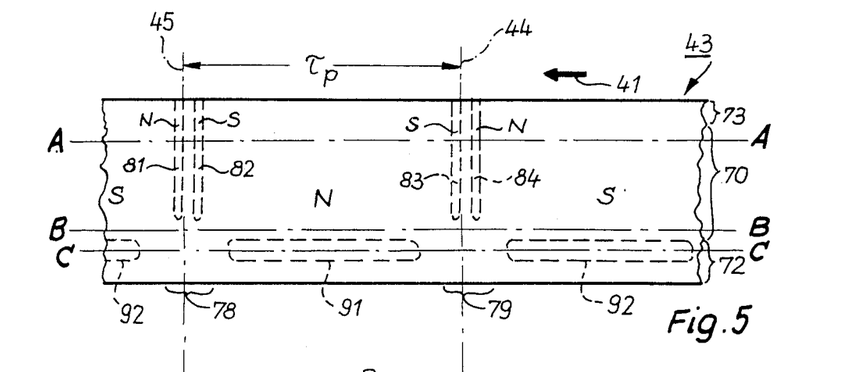
FIG. 5 is a developed view of the inner periphery of the external rotor of the motor of FIGS. 1–5.
Figure 6:
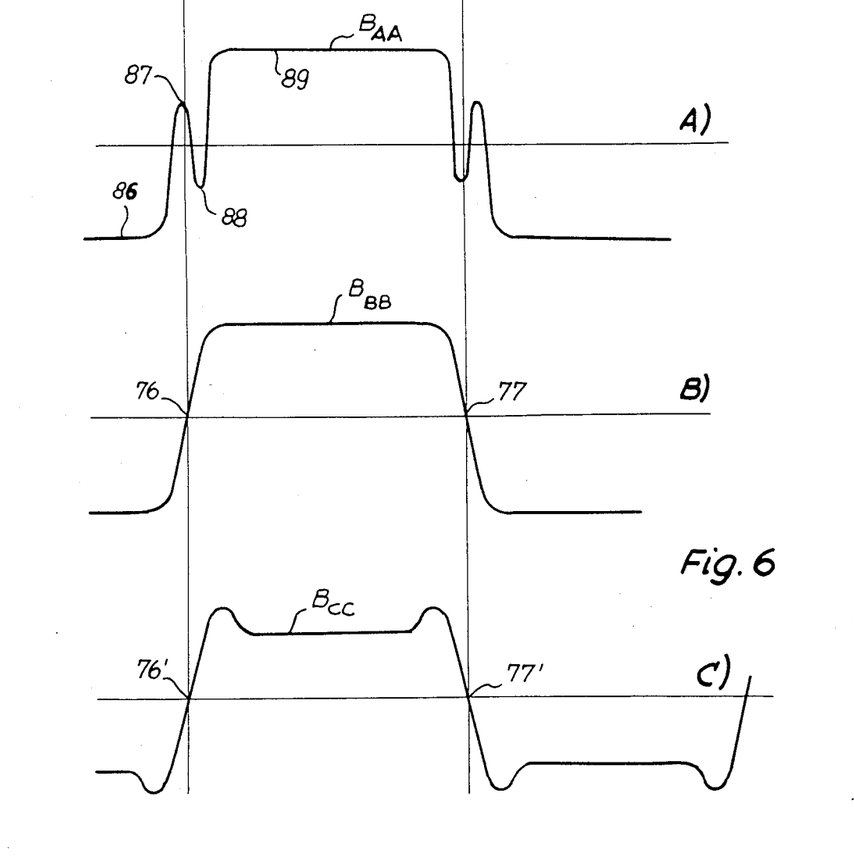
FIGS. 6A–6C are graphs of motor induction referred to in the description of the FIG. 5 developed view.

FIG. 5 depicts the rotor magnet 43 in developed view. The pole boundaries, which can alternatively be inclined, are denoted by 44 and 45 as in FIG. 2. The rotation direction is again denoted by 41.

The magnetization along the line B—B in FIG 5, namely along the "conventionally" magnetized rotor region 70, is as shown in FIG. 6B substantially trapezoidal in shape; i.e., over a range of about 160°-170°-el. the induction $B_{BB}$ is practically constant and in the region of the pole gaps or pole transitions falls steeply off, so that steep zero-crossovers result at 76 and 77.

In the upper rotor region, namely in the largest part of the electromotively active region 70 and possibly also in the upper overhang region 73, auxiliary poles are provided, at each transitional region 78, 79 between two main poles (which latter are denoted by the capital letters N and S).

At the transitional region 78, a north auxiliary pole 81 is provided within the pole-pitch $\tau_p$ of south main pole S, and a south auxiliary pole 82 is provided within the pole-pitch $\tau_p$ of north main pole N. 81, 82 each have an angular breadth of e.g. 4°-el. (typically in the range of 2°-10°-el.) and a spacing of for example 6°-el.; i.e. the free space between the auxiliary poles is 6°-el. This spacing, also, can typically be in the range of 2°-10°-el. If the pole boundaries 44, 45 are inclined, then of course the auxiliary poles will be correspondingly inclined.

As can be furthermore seen from FIG. 5, the auxiliary poles 81, 82 are not located symmetrically relative to the pole boundary 45, but instead are offset relative to the latter counter to the rotation direction. Specifically the auxiliary pole 81 is located practically at the pole boundary 45 and accordingly constitutes a continuation of the north-polarity main pole located to its right, whereas the auxiliary pole 82 is located at a distance from the pole boundary 45 and constitutes a south-pole island within the north-polarity main pole that surrounds it.

Of course, alternatively the auxiliary pole 81 can also be looked upon as a constituent part or prominence of the north-polarity main pole located to its right, so that one could equally well say that the north-polarity main pole is, at the location 81, widened in the rotation direction, and that only one auxiliary pole 82 is provided.

The matter of the offset shown in FIG. 5, and the question whether the pair of auxiliary poles 81, 82 of FIG. 5 is best looked upon as a pair of auxiliary poles or as a single auxiliary pole combined with a prolongation of one of the two main poles, can be alternatively and perhaps better described in the following terms: Each of the two main poles S and N at the main-pole boundary 45 has a pole pitch $\tau_p$ and a respective pole-middle located at equal angular distances from the two ends of the respective pole pitch $\tau_p$. First auxiliary pole 81 is angularly spaced from the pole-middle of main pole S by a respective first distance, measured along a first circumferential direction extending from auxiliary pole 81 to the pole-middle of main pole S. Likewise, second auxiliary pole 81 is angularly spaced from the pole-middle of main pole N by a respective second distance, measured along an opposite second circumferential direction extending from auxiliary pole 82 to the pole-middle of main pole N. Of these first and second distances, one is greater and the other lesser. The lesser one, clearly, is the second distance, namely the distance from auxiliary pole 82 to the pole-middle of main pole N, measured, as already stated, in the second circumferential direction. It is to be noted that such second circumferential direction is opposite to the intended rotation direction indicated by arrow 41. The sense of the aforementioned offset can thus also be understood in the way just set forth. The amount of the offset in question is equal to twice the difference between the aforementioned first distance and the aforementioned second distance. In other words, the offset is the angular distance by which the first distance would have to be decreased, and the second distance increased, to make the first and second distances equal to each other.

In the same way, at the transitional region 79, a south auxiliary pole 83 is provided to the left of the pole boundary 44, and a north auxiliary pole 84 is provided to the right of the pole boundary 44, the auxiliary poles being offset counter to the rotation direction 41 in the same way as the auxiliary poles 81, 82, with their induction being smaller than the induction of the main poles.

The induction along the line A—A of FIG. 5, at the surface of the rotor magnet 43, has the shape shown in FIG. 6A. In particular, the plotted induction(=magnetic-flux density) does not exhibit simple transitions from north polarity to south polarity, instead at each transitional region 78,79 three points are to be found where the slope of the induction plot changes from one mathematical sign to the opposite sign, a relative maximum and a relative minimum. For example in FIG. 6A, proceeding from left to right, the induction $B_{AA}$ comprises an initial a negative interval 86, followed by a short positive interval 87, and then a short negative interval 88 followed by a positive interval 89 of substantially constant amplitude.

At a certain distance from the auxiliary poles 81, 82 their respective inductions cancel each other out, so that considered at such distances these auxiliary poles seemingly constitute an unmagnetized portion of the rotor. Experiments, however, have shown that one cannot achieve the same results if the rotor 40, instead of being provided with these inventive auxiliary poles, were to be provided with an actually non-magnetic portion at the transitions between main poles).

In the lowermost region 72 of the rotor the induction weakens at each of the sectors 91, 92. These sectors each extend, for example over a 120°-el. interval at the middle parts of the poles, where they effect an induction decrease; see FIG. 6C where the induction variation along line C—C of FIG. 5 is depicted. The zero-crossovers 76', 77' of $B_{CC}$ coincide with the zero-crossovers 76, 77 and determine the times of occurrence of the commutations, inasmuch as the Hall-IC 30 if it has been correctly adjusted undergoes a change of state at each of these zero crossovers. The auxiliary poles 81–84 do not extend into the rotor region 72 sensed by the Hall-IC 30, because the auxiliary poles would interfere with commutation there.

Figure 7:
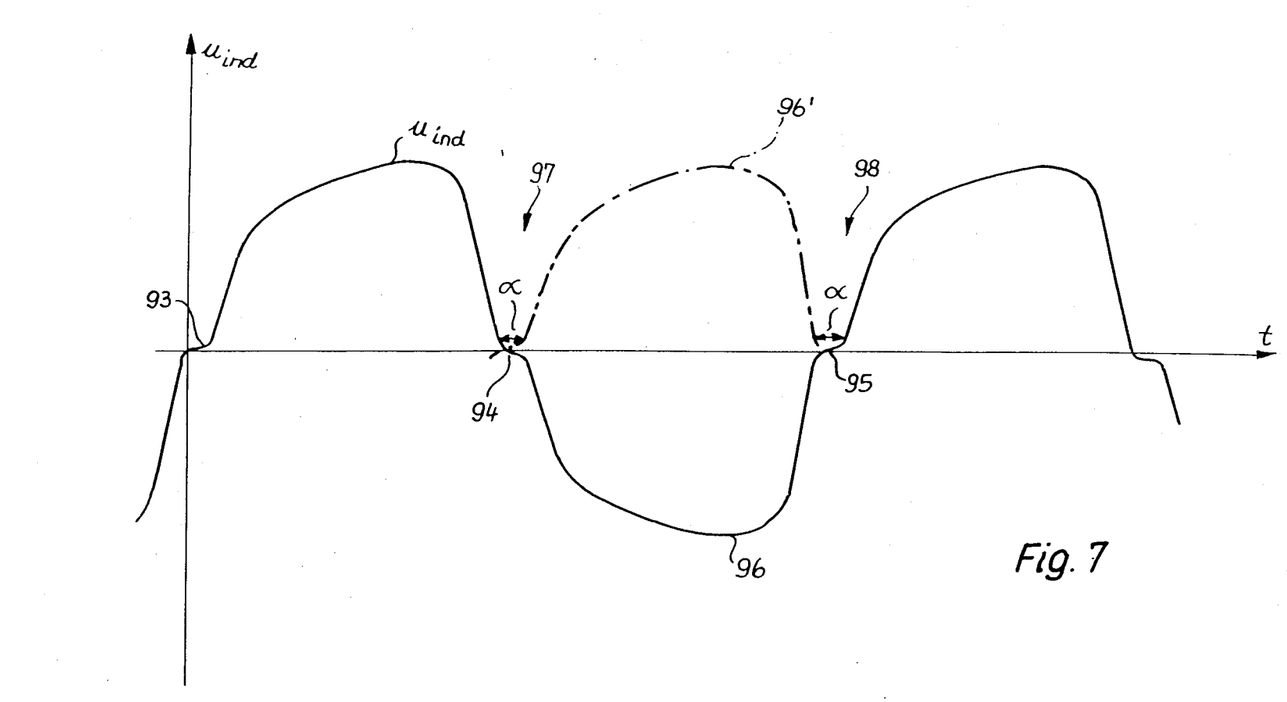
FIG. 7 is a graph of the voltage induced in the motor coils during motor operation.

FIG. 7 depicts the dependence of the induced voltage $u_{ind}$ upon rotor angular position at, of course, a given speed. This functional dependence is determined by turning rotor 40 and measuring the voltage actually induced in each of coils 24 and 25.

As can be seen, the induced voltage $u_{ind}$ is formed by positive and negative half-cycles which alternate with each other. In FIG. 7, the absolute value of the negative half-cycle 96 is shown in dash-dot lines as half-cycle 96'.

Reference numerals 97 and 98 each generally denotes a respective transitional interval exhibited by the induced voltage $u_{ind}$. During each transitional interval 97, 98 the induced voltage undergoes a transition from one voltage polarity to the opposite voltage polarity. The shape of the induced voltage during each such transitional intervals depends upon the particular manner in which the magnetization exhibited by the permanent-magnet rotor changes at each transition from a north to a south main pole and at each transition from a south to a north main pole. Generally, these main-pole transitions are such that the induced voltage in each coil undergoes, during a major part of each transitional interval 97 or 98, a gradual change from one voltage polarity to the opposite voltage polarity but with a slope of comparatively high absolute value. As a result, and as shown in FIG. 7, the absolute value of the voltage induced in each coil has generally the shape of a steep valley at each of the transitional intervals 97 and 98, and indeed is of relatively low value at those ranges of rotor angular position corresponding to the bottom regions of these valleys.

As a result, and undesirably, any electromagnetically generated torque produced by the motor during ranges of rotor angular position corresponding to these valleys, especially at rotor angular positions corresponding to the bottom regions of these induced voltage valleys, will likewise be of relatively low magnitude. As a result the electromagnetic torque, at such rotor angular positions, may simply be too low in value to maintain rotor rotation under high load, especially during motor start-up.

It is for this reason that one resorts to an auxiliary torque, for example an auxiliary reluctance torque, as already mentioned. Such auxiliary torque is exerted, at least during these induced voltage or electromagnetic torque valleys, or at least during the bottom regions thereof, in a predetermined direction which is the same as the desired rotation direction. During these valleys, and especially at the bottom regions thereof, the auxiliary torque may well be the only torque available to effect continued rotor rotation.

As will be understood by persons skilled in the art, the motor is in general to be commutated in the vicinity of the points 94, 95 where the induced voltage crosses the zero axis, at which points the electromagnetically generated torque is necessarily of zero value. However, the components of the circuitry that control the time of occurrence of each commutation necessarily exhibit variations within a range of manufacturing tolerances, so that the commutation may not in fact occur at such a zero-crossover point but instead earlier or later than intended by the designer. This can lead to significant problems.

To understand such problems, reference is made to FIG. 6B which, although a graph of induction, can for explanatory purposes be imagined to instead be a graph of induced voltage in the fashion of FIG. 7, with points 76, 77 being zero-crossover points of the induced voltage. Theoretically, a motor commutation should occur at for example the zero-crossover point 76, as well known to persons skilled in the art.

It will be understood that in a 2-pulse brushless d.c. motor, prior to the commutation, current flows through the coil(s) in a first direction or sense which, in combination with an induced voltage of a first polarity in such coil(s), results in an electromagnetic torque exerted in the desired direction. Subsequent to the commutation, current flows through the coil(s) in an opposite second direction or sense which, in combination with an induced voltage of an opposite second polarity in such coil(s), results in an electromagnetic torque that is likewise exerted in the driving direction. At the time of commutation, no current should flow in the coil(s).

Accordingly, in FIG. 6B, if the commutation occurs prior to (or subsequent to) the zero-crossover point 76, the consequence is that coil current of second sense combines with induced voltage of first polarity (or coil current of first sense combines with induced voltage of second polarity), to yield an electromagnetic braking torque which is exerted opposite to the desired rotation direction.

Furthermore, still imagining FIG. 6B to represent a graph, like FIG. 7, of induced voltage, it is noted that the transition from positive to negative induced voltage is of comparatively steep slope. Accordingly, if the motor commutation occurs not at crossover point 77, but instead earlier or later than that, then the electromagnetic torque at such time will not merely be exerted in the wrong direction but, furthermore, may be of fairly substantial value. This is undesirable because it is precisely during the transitional interval in question that the auxiliary torque, exerted in the driving direction, is being relied upon. In other words, the unintended non-zero electromagnetic torque, exerted in the braking direction and quite possibly of fairly substantial value, will be subtracted from the auxiliary torque, exerted in the driving direction. As a result, the reduced effective value of the reluctance torque may easily become inadequate to maintain rotor rotation, particularly during motor start-up.

In present FIG. 7, the problem in question is greatly alleviated. The transitional interval during which the induced voltage gradually changes from a positive to a negative voltage polarity continues to exhibit, during the major part of this transitional interval, a comparatively steep slope. However, during an intermediate minor part $\alpha$ of the transitional interval, the induced voltage, in accordance with the present invention: has a slope of comparatively low absolute value at least approximately equal to zero; in general is of a magnitude at least approximately equal to zero; and, furthermore, includes the zero-crossover point 94 at which a motor commutation should in theory occur. The aforesaid intermediate minor part $\alpha$ of the transitional interval of the induced voltage amounts to between 8° and 20°-el.

Assume, for example, that the angular span $\alpha$ of the intermediate minor part of the induced voltage's transitional region amounts to, in particular, 20°-el., i.e., 10°-el. to either side of the zero-crossover point 94. As a result, the commutation, if it occurs as much as 10°-el. earlier or later than intended will not produce a braking-direction electromagnetic torque of more than negligible magnitude. More generally, given that $\alpha$ amounts to between 8° and 20°-el., errors in the time of commutation amounting to between ±4°-el. and ±10°-el. can be tolerated without the timing error having any significant deleterious effect upon the ability of the 2-pulse motor to be self-starting.

Figure 8:
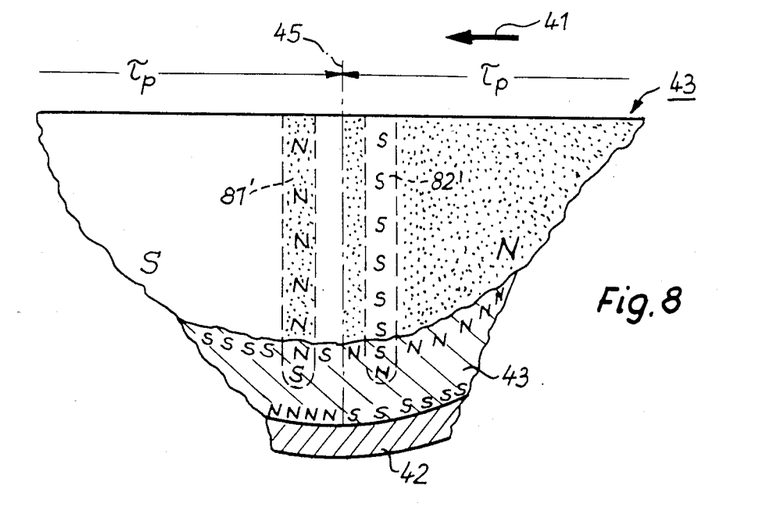
FIG. 8 is a developed view of the inner periphery of a modified and less advantageous version of the external rotor shown in FIG. 5.
Figure 9:
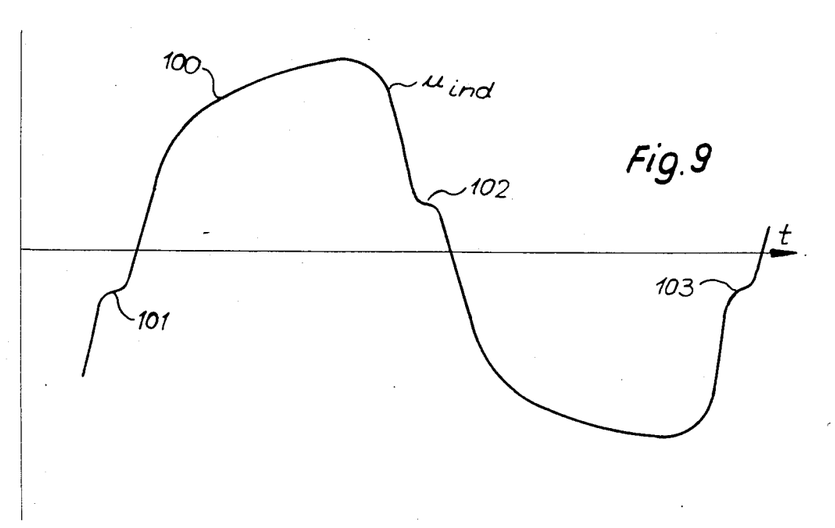
FIG. 9 is a graph of the voltage induced in the motor coils when using the modified rotor design of FIG. 8.

FIG. 8, in contrast to FIG. 5, depicts a symmetrical arrangement of the auxiliary poles 81', 82' relative to the pole boundary 45, and FIG. 9 depicts the induced voltage produced in such case. In FIG. 9 the intervals 101, 102, 103 of approximately zero slope are not produced at the zero-crossovers, but instead at certain magnitudes of the induced voltage voltage. Such a voltage waveform may be of use for certain purposes, but it continues to exhibit a steep slope at the zero-crossover points and therefore does not alleviate the problems discussed above that occur with early or late commutation. It is much better to shift the auxiliary poles 81', 82' counter to the rotation direction in the manner of FIG. 5 to obtain the induced voltage of FIG. 7. FIG. 8, furthermore, depicts the rotor magnet 43 and the rotor bell 42 in partial section. One can see that the auxiliary poles do not extend through the entire thickness of the magnet 43 but instead penetrate only partially into the latter, which limits the latter's induction. In the sectioned portion of FIG. 8 the magnetization relationships are indicated in customary manner by N and S.

Figure 10:
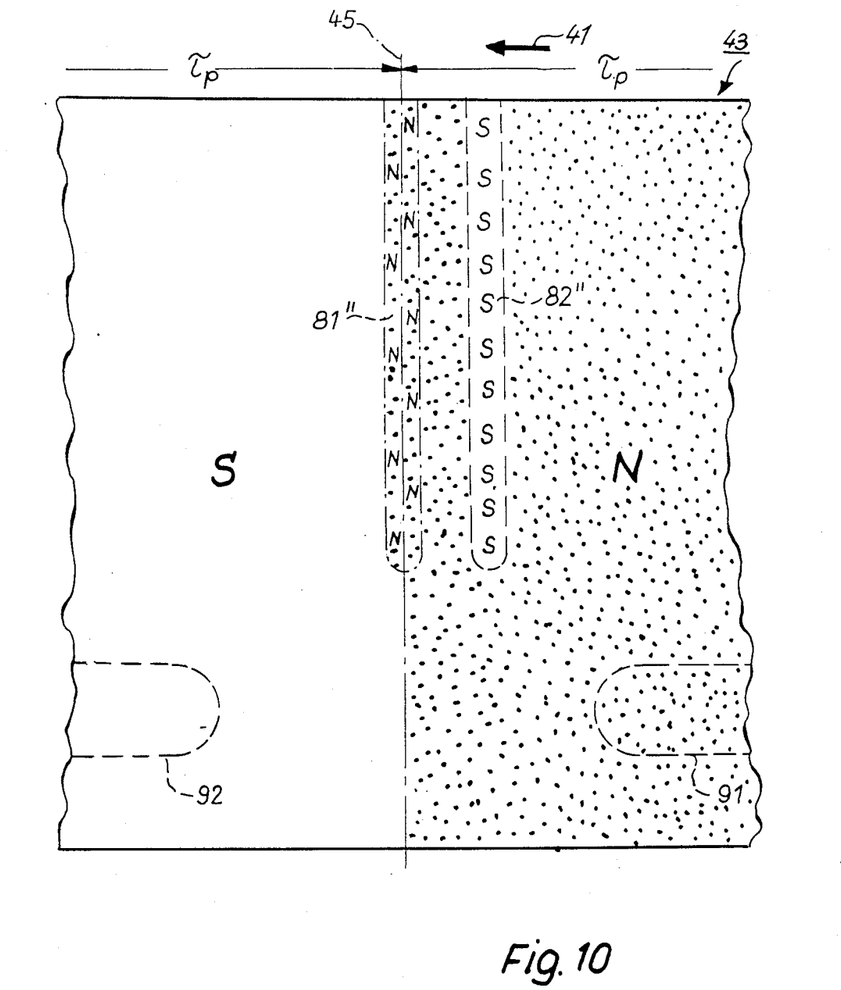
FIG. 10 is a developed view similar to FIG. 5 of the inner periphery of the external rotor of a brushless d.c. motor which constitutes a second embodiment of the invention and has a structure that in other respects is the same as in FIGS. 1–4.

FIG. 10 illustrates a considerable shift of the auxiliary poles 81" and 82" counter to the rotation direction 41. In this situation the south auxiliary pole 81" again becomes an enclosure within the north-polarity main pole at the right of pole boundary 45, and the pole boundary of the north-polarity main pole is, in the region of the auxiliary pole 81", displaced somewhat in the rotation direction 41. In this event there is again present, de facto, only a single auxiliary pole 82", and the pole boundary has a somewhat S-shaped variation if seen in top-view.

FIG. 11 shows in top-view the permanent-magnet rotor 110 of a motor having a flat air gap. Such a motor is illustrated in detail in, e.g., FIGS. 1–4 of U.S. Pat. No. 3,840,761, to which reference is made for the sake of brevity herein. The induction variation along the line A—A corresponds to FIG. 6A, and the induction variation along the line B—B corresponds to FIG. 6B. Regions of attenuation induction can likewise be provided if the induced voltage is to be correspondingly modified. The pole boundaries are denoted by 111–114 in FIG. 11 and the auxiliary poles by 115–122. These likewise are offset counter to the rotation direction.

Of course for the person of ordinary skill a multitude of changes and modifications are possible within the scope of the invention without departing from the scope of the invention. An inventive motor is especially suited for applications in which the motor is provided with a brake that in its unenergized state holds the rotor fixed. A preferred field of application are drive motors for so-called disk drives, but also motors for fans and other drives achieve by means of the invention a high start-up reliability with very good reluctance torque.

What is claimed is:

1. An improved two-pulse brushless d.c. motor of the type comprising
   (a) a wound stator provided with at least one conductor, each conductor being wound to form at least one concentrated coil,
   (b) a permanent-magnet rotor,
   (c) mounting means mounting said rotor for rotation relative to said stator about a predetermined rotation axis,
   (d) said rotor being provided with a circumferential succession of permanently magnetic north-polarity and south-polarity main poles which alternate with each other proceeding circumferentially about the rotor,
   (e) said at least one coil and said main poles of said rotor being relatively positioned in such a manner that said rotor generates in each coil an induced voltage formed by positive half-cycles and negative half-cycles which alternate with each other and which result from exposure of the coil to transitions from rotor flux of one polarity to rotor flux of the opposite polarity, these transitions occurring as the rotor continually assumes successive angular positions during rotor rotation,
   (f) the induced voltage in each coil exhibiting transitional intervals, equal in number to the number of main poles of said rotor, during each one of which the voltage induced in each coil undergoes a respective transition from one voltage polarity to the opposite voltage polarity, the shape of each such induced voltage transition being dependent upon the manner in which said transitions from rotor flux of one polarity to rotor flux to the opposite polarity occur, and accordingly being dependent upon the particular manner in which the magnetization exhibited by said permanent-magnet rotor changes at each transition from a north to a south main pole thereof and at each transition from a south to a north main pole thereof,
   (g) the manner in which said transitions from rotor flux of one polarity to rotor flux of the opposite polarity occur being such that the induced voltage in each coil undergoes, during a major part of each transitional interval, a respective gradual change from one voltage polarity to the opposite voltage polarity but with a slope of comparatively high absolute value, such that the voltage induced in each coil contributes to form a total induced voltage the absolute value of which has during each such transitional interval the shape of an induced voltage valley,
   (h) whereby any electromagnetically generated torque produced during such induced voltage valleys will likewise be, at the lower regions of such valleys where the induced voltage is of relatively low absolute value, of relatively low absolute value and therefore be unable to maintain rotor rotation under high load, especially during motor start-up,
   (i) the brushless d.c. motor being provided with means operative during the induced voltage valleys for furnishing a not electromagnetically generated auxiliary torque, exerted in a predetermined direction constituting the desired rotation direction, whereby to compensate for relatively low values of electromagnetically generated torque produced during the induced voltage valleys,
   the improvement wherein:
   (j) said permanent-magnet rotor is configured and magnetized, at each transition from a main pole of one polarity to a main pole of the opposite polarity, to form means operative in such a manner that during each of said transitional intervals of induced voltage said total induced voltage has, during an intermediate minor part of such transitional interval, a slope of comparatively low absolute value at least approximately equal to zero, a magnitude at least approximately equal to zero, and at one point a value exactly equal to zero, wherein said point is located intermediate the start and end of said intermediate minor part of the transitional interval and constitutes a zero-crossover point at which said total induced voltage changes from one voltage polarity to the opposite voltage polarity,
   (k) whereby to assure that electromagnetically generated torque produced by the motor during motor operation will have an absolute value at least approximately equal to zero within said intermediate minor part of the transitional interval,
   (l) so that a commutation intended to occur at a rotor angular position in the vicinity of said zero-crossover point but occurring earlier or later than intended will, if the commutation at worst occurs within said intermediate minor part of the transitional interval, not cause electromagnetically generated torque to be exerted opposite to said desired rotation direction and thus undesirably counteract said auxiliary torque.

2. A brushless d.c. motor as defined in claim 1 wherein each intermediate minor part of the respective transitional interval of said induced voltage has an angular span amounting to between 8 and 20 electrical degrees.

3. A brushless d.c. motor as defined in claim 1,
said transitions between north and south main poles constituting magnetization transitions,
the magnetization exhibited by said permanent-magnet rotor, at each one of said magnetization transitions, being such as to include an auxiliary pole,
the auxiliary pole being located within the pole pitch of a first one of the two main poles that are located at the respective magnetization transition but having the magnetic polarity of the other of the two main poles located at the respective magnetization transition.

4. A brushless d.c. motor as defined in claim 1,
said transitions between north and south main poles constituting magnetization transitions,
the magnetization exhibited by said permanent-magnet rotor, at each one of said magnetization transitions, being such as two include a north auxiliary pole and a south auxiliary pole,
the north auxiliary pole being located within the pole pitch of the south main pole located at the respective magnetization transition,
the south auxiliary pole being located within the pole pitch of the north main pole located at the respective magnetization transition.

5. A brushless d.c. motor as defined in claim 3,
the angular span of said auxiliary pole being small compared to said pole pitch.

6. A brushless d.c. motor as defined in claim 4,
said north and said south auxiliary pole each having a respective angular span which is small compared to the pole pitch of the south and of the north main poles.

7. A brushless d.c. motor as defined in claim 3,
said auxiliary pole having an angular span no greater than about 10 electrical degrees.

8. A brushless d.c. motor as defined in claim 7,
said auxiliary pole haaving an angular span amounting to between 5 and 8 electrical degrees.

9. A brushless d.c. motor as defined in claim 4,
said north and said south auxiliary pole each having a respective angular span no greater than about 10 electrical degrees.

10. A brushless d.c. motor as defined in claim 9,
said north and said south auxiliary pole each having a respective angular span amounting to between 5 and 8 electrical degrees.

11. A brushless d.c. motor as defined in claim 3,
said auxiliary pole being an elongated auxiliary pole which extends perpendicular to the rotor rotation direction.

12. A brushless d.c. motor as defined in claim 4,
said north and said south auxiliary pole each being an elongated auxiliary pole which extends perpendicular to the rotor rotation direction.

13. A brushless d.c. motor as defined in claim 4,
the north main pole located at said respective magnetization transition having a north-pole middle located at equal angular distances from the two ends of the pole pitch thereof,
the south main pole located at said respective magnetization transition having a south-pole middle located at equal angular distances from the two ends of the pole pitch thereof,
said north auxiliary pole being spaced from said south-pole middle by a first predetermined angular distance, said first predetermined angular distance being measured along a first circumferential direction extending from said north auxiliary pole to said south-pole middle,
said south auxiliary pole being spaced from said north-pole middle by a second predetermined angular distance, said second predetermined angular distance being measured along an opposite second circumferential direction extending from said south auxiliary pole to said north-pole middle,
one of said first and second circumferential directions being the same as said desired rotation direction and the other of said first and second circumferential directions being opposite to said desired rotation direction,
one of said predetermined angular distances being a greater angular distance and the other being a lesser angular distance,
said lesser angular distance being the one which is measured along the one of said circumferential directions that is opposite to said desired rotation direction.

14. A brushless d.c. motor as defined in claim 13,
said north and south main poles exhibiting a so-called trapezoidal magnetization pattern according to which the induction of each main pole is approximately constant throughout substantially the entire pole pitch thereof except at the start and end regions of the pole pitch,
the difference in magnitude between said first and said second predetermined angular distance being equal to twice a predetermined offset angle, said offset angle being the angle by which said greater angular distance would have to be decreased and said lesser angular distance increased in order to make said first and second predetermined angular distances equal to each other,
said offset angle being no greater than about 10 electrical degrees.

15. A brushless d.c. motor as defined in claim 14,
said north and said south auxiliary pole each having a respective angular span no greater than about 10 electrical degrees.

16. A brushless d.c. motor as defined in claim 3,
said circumferential succession of main poles comprising first and second circumferentially extending regions, each of said circumferentially extending regions having an inner boundary and an outer boundary,
the inner boundaries of said first and second circumferentially extending regions facing towards each other, the outer boundaries of said first and second circumferentially extending regions facing away from each other and being spaced from each other perpendicular to the circumferential direction,
the motor being furthermore provided with rotor-position-sensing means positioned to sense rotor flux emanating from said second circumferentially extending region of said circumferential succession of main poles,
wherein the at least one auxiliary pole does not extend into said second circumferentially extending region, in order not to interfere with the operation of said rotor-position sensing means.

17. A brushless d.c. motor as defined in claim 4,
said circumferential succession of main poles comprising first and second circumferentially extending regions, each of said circumferentially extending regions having an inner boundary and an outer boundary,
the inner boundaries of said first and second circumferentially extending regions facing towards each other, the outer boundaries of said first and second circumferentially extending regions facing away from each other and being spaced from each other perpendicular to the circumferential direction,
the motor being furthermore provided with rotor-position-sensing means positioned to sense rotor flux emanating from said second circumferentially extending region of said circumferential succession of main poles,
wherein said auxiliary poles do not extend into said second circumferentially extending region, in order not to interfere with the operation of said rotor-position sensing means.

18. A brushless d.c. motor as defined in claim 16,
each of said main poles being provided at said second circumferentially extending region with a respective zone of reduced magnetic-flux density, each zone of reduced magnetic-flux density occupying a predetermined sector of the respective main pole, said predetermined sector being located at least approximately midway between the two ends of the pole pitch of the respective main pole.

19. A brushless d.c. motor as defined in claim 18,
each zone of reduced magnetic-flux density being an elongated zone which extends in the circumferential direction, has an angular span less than the pole pitch of the respective main pole, and has leading and trailing ends each of which is angularly spaced from the nearer one of the two ends of the pole pitch of the respective main pole.

20. A brushless d.c. motor as defined in claim 1,
wherein said means operative during the induced voltage valleys for furnishing an auxiliary torque comprises reluctance-torque-producing portions provided on said stator designed to produce an auxiliary reluctance torque which constitutes at least part of said auxiliary torque.

* * * * *